(12) United States Patent
Hiddema et al.

(10) Patent No.: US 9,807,997 B2
(45) Date of Patent: Nov. 7, 2017

(54) AGRICULTURAL SPRAYER BOOM

(71) Applicant: AGCO International GmbH, Hesston, KS (US)

(72) Inventors: Joris Jan Hiddema, Grubbenvorst (NL); Harm Mertens, Grubbenvorst (NL)

(73) Assignee: AGCO International, Neuhausen (CH)

( * ) Notice: Subject to any disclaimer, the term of this patent is extended or adjusted under 35 U.S.C. 154(b) by 0 days.

(21) Appl. No.: 15/311,254

(22) PCT Filed: May 26, 2015

(86) PCT No.: PCT/EP2015/061563
§ 371 (c)(1),
(2) Date: Nov. 15, 2016

(87) PCT Pub. No.: WO2015/185390
PCT Pub. Date: Dec. 10, 2015

(65) Prior Publication Data
US 2017/0086449 A1   Mar. 30, 2017

(30) Foreign Application Priority Data
Jun. 4, 2014 (GB) .................................. 1409923.8

(51) Int. Cl.
| | |
|---|---|
| *A62C 13/76* | (2006.01) |
| *A01M 7/00* | (2006.01) |
| *A01C 23/00* | (2006.01) |
| *A01G 25/09* | (2006.01) |
| *F16L 3/16* | (2006.01) |
| *B21C 23/14* | (2006.01) |
| *B21D 47/01* | (2006.01) |

(52) U.S. Cl.
CPC .......... *A01M 7/0075* (2013.01); *A01C 23/00* (2013.01); *A01G 25/09* (2013.01); *B21C 23/142* (2013.01); *B21D 47/01* (2013.01); *F16L 3/16* (2013.01)

(58) Field of Classification Search
USPC ............................................ 248/75
See application file for complete search history.

(56) References Cited

U.S. PATENT DOCUMENTS 4,834,249 A * 5/1989 Dahl .................. A01M 7/0078
212/258
4,881,603 A * 11/1989 Hartman ............. A01B 73/067
172/311
(Continued)

FOREIGN PATENT DOCUMENTS

DE    202009015805 U1    8/2010
EP        1525784 A2     4/2005
(Continued)

OTHER PUBLICATIONS

UK Intellectual Property Office, International Search Report for priority Application No. GB1409923.8, dated Dec. 1, 2014.
(Continued)

*Primary Examiner* — Monica Millner

(57) ABSTRACT

An agricultural sprayer boom comprises vertically spaced upper and lower beams extending along the boom and connected by brace members formed from a unitary bent tubular member that is secured to the upper and lower beams, and gripped, by clamps.

7 Claims, 6 Drawing Sheets

(56) References Cited

U.S. PATENT DOCUMENTS

| | | | | |
|---|---|---|---|---|
| 5,203,442 A * | 4/1993 | Oury | ............ | B28C 5/4255 198/313 |
| 5,310,115 A * | 5/1994 | Broyhill | ............ | A01M 7/0075 239/168 |
| 6,217,251 B1 * | 4/2001 | Kato | ............ | F16B 17/004 403/341 |
| 6,966,501 B2 * | 11/2005 | Wubben | ............ | A01M 7/0075 239/168 |
| 7,354,235 B2 * | 4/2008 | Hettiger | ............ | A01D 43/087 414/304 |
| 7,740,190 B2 * | 6/2010 | Peterson | ............ | A01M 7/0078 16/281 |
| 8,752,360 B2 * | 6/2014 | Lohrentz | ............ | A01D 67/00 56/208 |
| 8,882,053 B2 * | 11/2014 | Chirpich | ............ | F16L 3/1075 211/70.1 |
| 8,939,383 B2 * | 1/2015 | Honermann | ............ | A01M 7/0071 156/60 |
| 8,979,415 B2 * | 3/2015 | Bouten | ............ | A01M 7/0071 239/159 |
| 2004/0238659 A1 * | 12/2004 | Wubben | ............ | A01M 7/0075 239/166 |
| 2006/0201075 A1 * | 9/2006 | Rivas | ............ | A01M 7/0071 52/111 |
| 2006/0228198 A1 * | 10/2006 | Hettiger | ............ | A01D 43/087 414/304 |
| 2007/0131791 A1 * | 6/2007 | Peterson | ............ | A01M 7/0078 239/166 |
| 2012/0273590 A1 * | 11/2012 | Honermann | ............ | A01M 7/0071 239/159 |
| 2012/0275847 A1 * | 11/2012 | Bouten | ............ | A01M 7/0071 403/267 |
| 2013/0099070 A1 * | 4/2013 | Chirpich | ............ | F16L 3/1075 248/73 |
| 2013/0291511 A1 * | 11/2013 | Lohrentz | ............ | A01D 67/00 56/208 |

FOREIGN PATENT DOCUMENTS

| | | |
|---|---|---|
| FR | 2662579 A1 | 12/1991 |
| GB | 2100962 A | 1/1983 |

OTHER PUBLICATIONS

European Patent Office, International Search Report for International Patent Application No. PCT/EP2015/061563, mail date of Jul. 29, 2015.

* cited by examiner

AGRICULTURAL SPRAYER BOOM

FIELD OF INVENTION

The invention relates to the construction of agricultural sprayer booms and particularly to those employing a truss-based structure having upper and lower beams connected by a plurality of brace members.

BACKGROUND

Agricultural sprayers are used by farmers and contractors to apply pesticides and other nutrient-containing solutions to crop fields. Sprayers can be mounted to, or towed by, a tractor or other suitable vehicle or may be self-propelled with an integrated means of propulsion and a drivers cab. The sprayer machine typically includes a storage tank for the liquid to be applied, the tank being filled as required by the operator.

The liquid is applied to the field by a number of liquid application devices, typically spray nozzles, which are mounted in a spaced relationship along the length of a boom which, itself, is mounted to the sprayer vehicle. The nozzles are each connected to the storage tank by liquid delivery means comprising various pipes, valves, pumps and other plumbing. The liquid is atomised by the nozzles and applied to the crop in a jet of mist for example.

The length of the boom determines the operating width of the sprayer. Driven by economies of scale, there is a growing demand for sprayer manufacturers to produce machines with longer spray booms. However, increasing the boom length significantly increases the risk of structural failure due to the increased stress placed upon the hinges and joints caused by natural vibrations and oscillations which pass from the spray vehicle along the boom. Today, boom lengths of conventional truss-style construction are approaching theft physical limits with any further increase in length requiring significant strengthening of the joints, mountings and hinges between sections and along the boom.

Booms having a truss-style construction suffer from peak stresses at the nodes where diagonal brace members are secured to the upper and lower beams. Conventionally welded joints have been employed to secure the braces but these dictate the structural strength of the overall boom and are known to crack or fail completely under high load conditions.

SUMMARY OF INVENTION

It is an object of the invention to provide an agricultural sprayer boom with improved resistance to failure.

In accordance with the invention there is provided an agricultural sprayer boom comprising vertically spaced upper and lower beams extending along the boom connected by a plurality of brace members formed from a unitary bent tubular is member that is secured to the upper and lower beams, and gripped by, a plurality of clamps.

Advantageously, by gripping the tubular member which forms the diagonal braces, rather than welding or pinning, the peak stresses at the truss nodes are reduced in turn reducing the risk of structural failure. In turn, this allows for the construction of longer boom sections.

The tubular member is preferably formed from aluminium so as to further increase the strength-to-weight ratio of the boom. Aluminium, not suited to welded joints, is a convenient material to bend into shape and lends itself well to the invention.

In one preferred arrangement at least one of the upper and lower beams presents a linear protuberance extending along the boom axis, wherein each of said clamps comprises a pair of parallel clamping sleeves which grip the protuberance and the tubular member respectively.

Each clamp preferably comprises two halves each having a profile that defines a portion of each of the clamping sleeves, wherein the halves of each clamp are secured together by bolts.

In another preferred embodiment the at least one of the upper and lower beams present a pair of opposing ledges, and wherein each clamp comprises a pair of lips and a channel, and wherein each lip engages a respective one of the ledges and the tubular member is received in the channel and held against the at least one of the upper and lower beams.

Each clamp may comprise two halves which are held together by a respective bolt.

At least one, and preferably both, of the upper and lower beams are formed from extrusion, wherein the profile of the beam is defined in the extrusion process. The ledges or linear protuberance are preferably defined by the extruded profile.

Alternatively, pultrusion may be employed instead of extrusion.

BRIEF DESCRIPTION OF DRAWINGS

Further advantages of the invention will become apparent from reading the following description of specific embodiments of the invention with reference to the appended drawings in which.

DETAILED DESCRIPTION OF SPECIFIC EMBODIMENT

Figure 1:
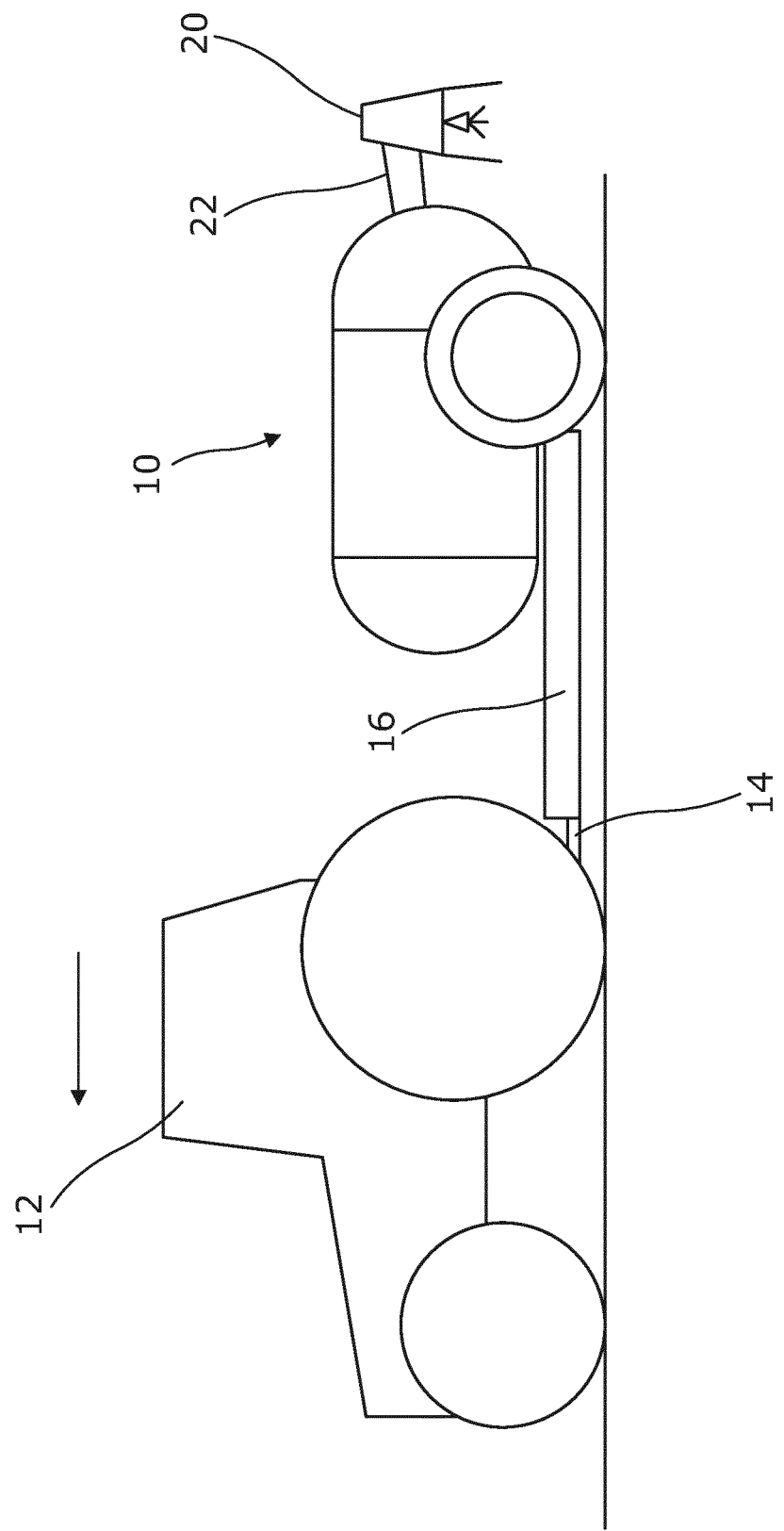
FIG. 1 is a schematic side representation of a tractor and a pull-type sprayer.
Figure 2:
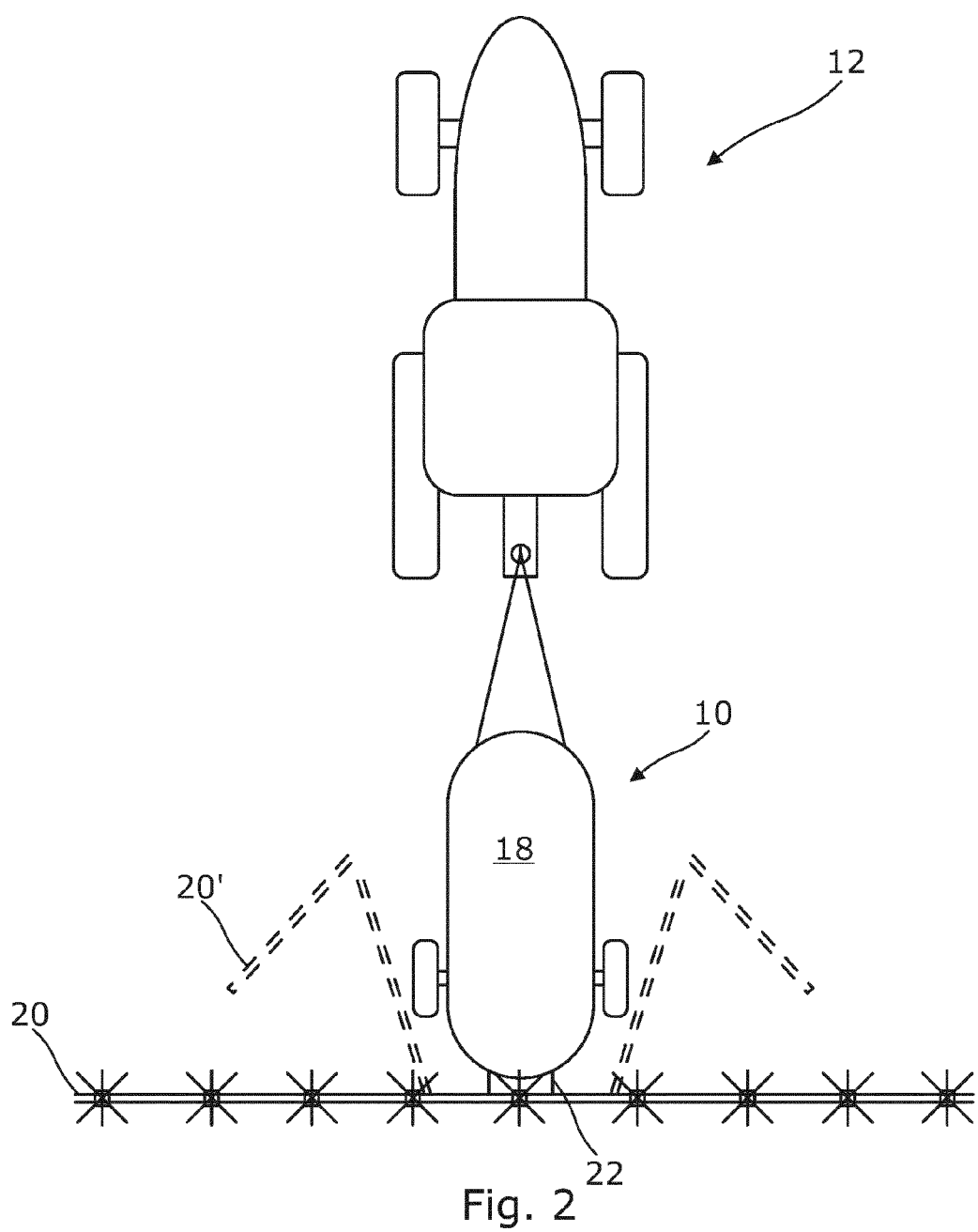
FIG. 2 is a schematic plan representation of the tractor and sprayer of FIG. 1.
Figure 3:
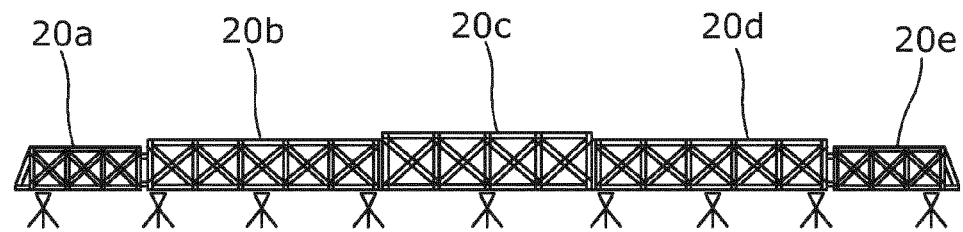
FIG. 3 is a rear view of the sprayer of FIG. 1 showing the multi-section boom in an unfolded configuration.

With reference to FIGS. 1, 2 and 3 a pull-type agricultural sprayer 10 is represented in schematic form from various views. The sprayer 10 is attached to the rear of a tractor 12 by means of towing hitch 14 associated with the tractor and a drawbar tongue 16 forming part of the chassis of the sprayer 10. The sprayer 10 includes a storage tank 18 which serves to store the liquid material to be applied to a crop field.

A transversely-extending multi-section boom 20 is formed from five separate boom sections 20a to 20e which are connected by hinge means and aligned with one another in the operating configuration shown. In this configuration the boom 20 extends substantially at right angles to the forward direction of travel, represented by arrow F in FIG. 1.

A central boom section 20c is fixed to the rear of the sprayer 10 by a suitable linkage represented at 22. As in known sprayer machines, the linkage 22 may permit raising and lowering of the boom to adapt to different crops and conditions.

The boom 20 further comprises a left-hand boom assembly and a right-hand boom assembly each hingeably mounted to respective ends of the central boom section 20c for pivoting movement around a substantially vertical axis. Left-hand boom assembly comprises an inner boom section 20b mounted to the central boom section 20c and an outer boom section 20a hingeably connected to the inner boom section 20b. Right-hand boom assembly comprises an inner boom section 20d mounted to the central boom section 20c and an outer boom section 20e hingeably connected to the inner boom section 20d.

The pivoting connections between the respective boom sections 20a-e allow the multi-section boom 20 to be folded into a transport configuration represented schematically by dashed 20'. It should be recognised that the folding mechanism and construction of the boom 20 is shown in highly schematic form and is not particularly relevant to the invention. Moreover, it should be noted that the central boom section 20c may be lighted in construction because it does not encounter the large bending forces experienced by the other boom sections 20a, 20b, 20d, 20e.

The invention to be described below relates to the construction of a boom (or boom section) for mounting to an agricultural sprayer such as that shown in FIGS. 1 and 2. It should be understood that the boom construction described hereinafter can be used in conjunction with different types of agricultural sprayer including mounted, trailed and self-propelled.

The following description makes reference to "booms" but it should be understood that the constructions described can be applied to a single boom section of a multi-section boom, and the term "boom" shall encompass "boom section" also.

Figure 4:
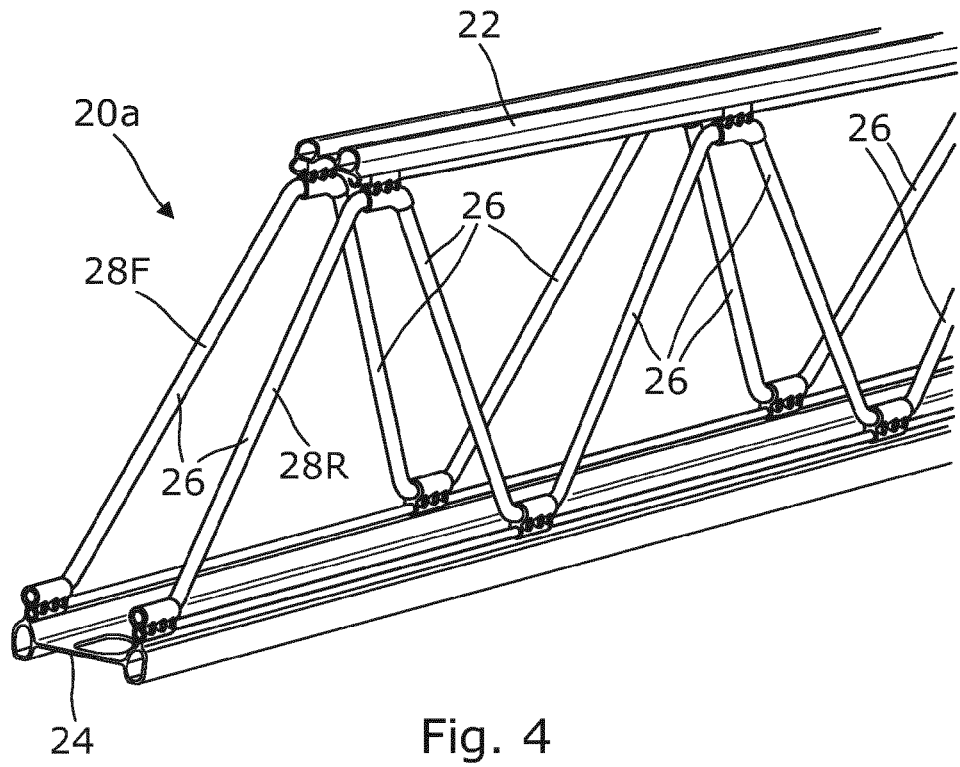
FIG. 4 is a perspective view of part of a boom section constructed in accordance with a first embodiment of the invention.

FIG. 4 shows outer (wing) section 20a and will be used to describe an embodiment of the invention. It will, however, be understood that the invention can be applied to one or more of the boom sections 20a-20e. Boom section 20a comprises an upper beam member 22 and a lower beam member 24 having a mutual parallel relationship and spaced apart vertically. Each beam member 22,24 extends along the axis of the boom section and is formed from an extrusion process. In the example shown each beam member has a pair of parallel tubular elements spaced horizontally and connected by a plate member. It should be appreciated however that the beam members may be formed in many different ways.

Connecting the upper and lower beams 22,24 are a plurality of braces 26 each angled at approximately 45 degrees to the horizontal and forming triangulated front and rear 2D structures. A front set of braces are provided by a first tubular member 28F which is bent at locations spaced along the length of the member. Similarly, a rear set of braces are provided by a second tubular member 28R.

Figure 5:
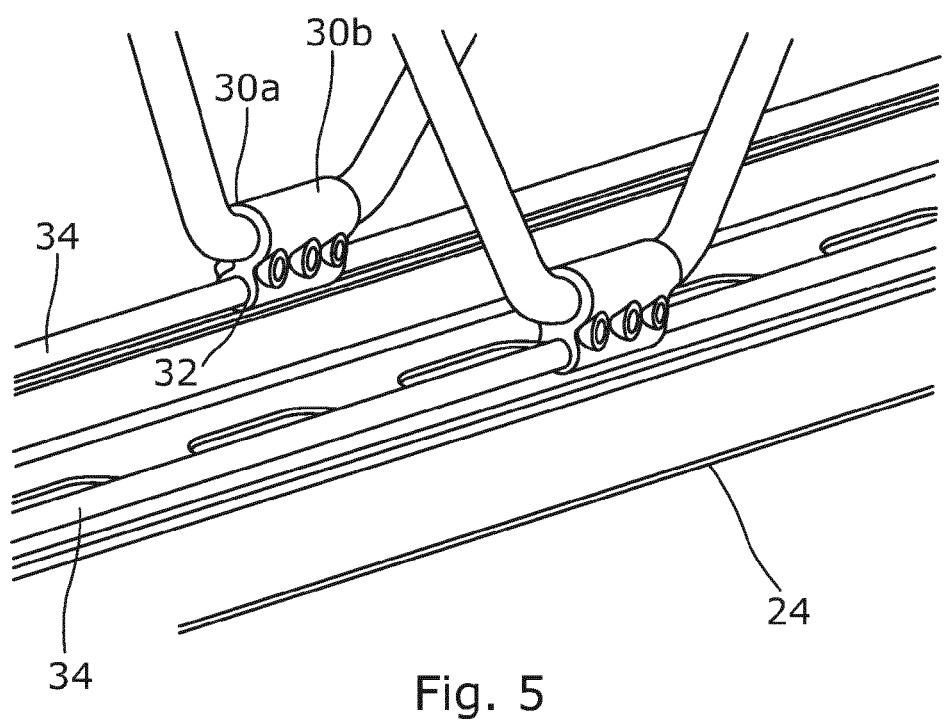
FIG. 5 is an enlarged perspective view of part of the boom section of FIG. 4.

Each of the first and second tubular members 26F,26R are secured to the upper and lower beams 22,24 by a plurality of clamps 30. With reference to FIG. 5, each clamp 30 comprises a pair of clamp elements 30a,30b each comprising half cylinder indents which, when brought together, present a pair of parallel gripping sleeves. A first sleeve 32 serves to grip a linear protuberance 34 formed in the extruded lower beam member 24 and extending along the boom axis. A second, wider, sleeve 36 serves to grip a region of the tubular brace member. The clamp is tightened by three threaded bolts (not shown).

At the region of clamping, each of the first and second members 26F,26R are bent so as to provide a relatively short length aligned substantially parallel to the boom axis and which is suitable for gripping by the clamps 30.

Although the clamps 30 illustrated in FIG. 5 grip the lower beam 24, it should be understood that similar means are employed to secure the upper beam 22.

The first and second members 28F,28R are preferably formed from aluminium due to its favourable bending properties, low weight and durability. However, steel or composite materials may be employed instead.

In a second embodiment illustrated in FIGS. 6 to 9, the clamps employed grip the tubular brace members by holding them against a surface of the respective upper and lower beams, dispensing with the need for the clamp to grip a protuberance of the beams as in the case above.

Figure 6:
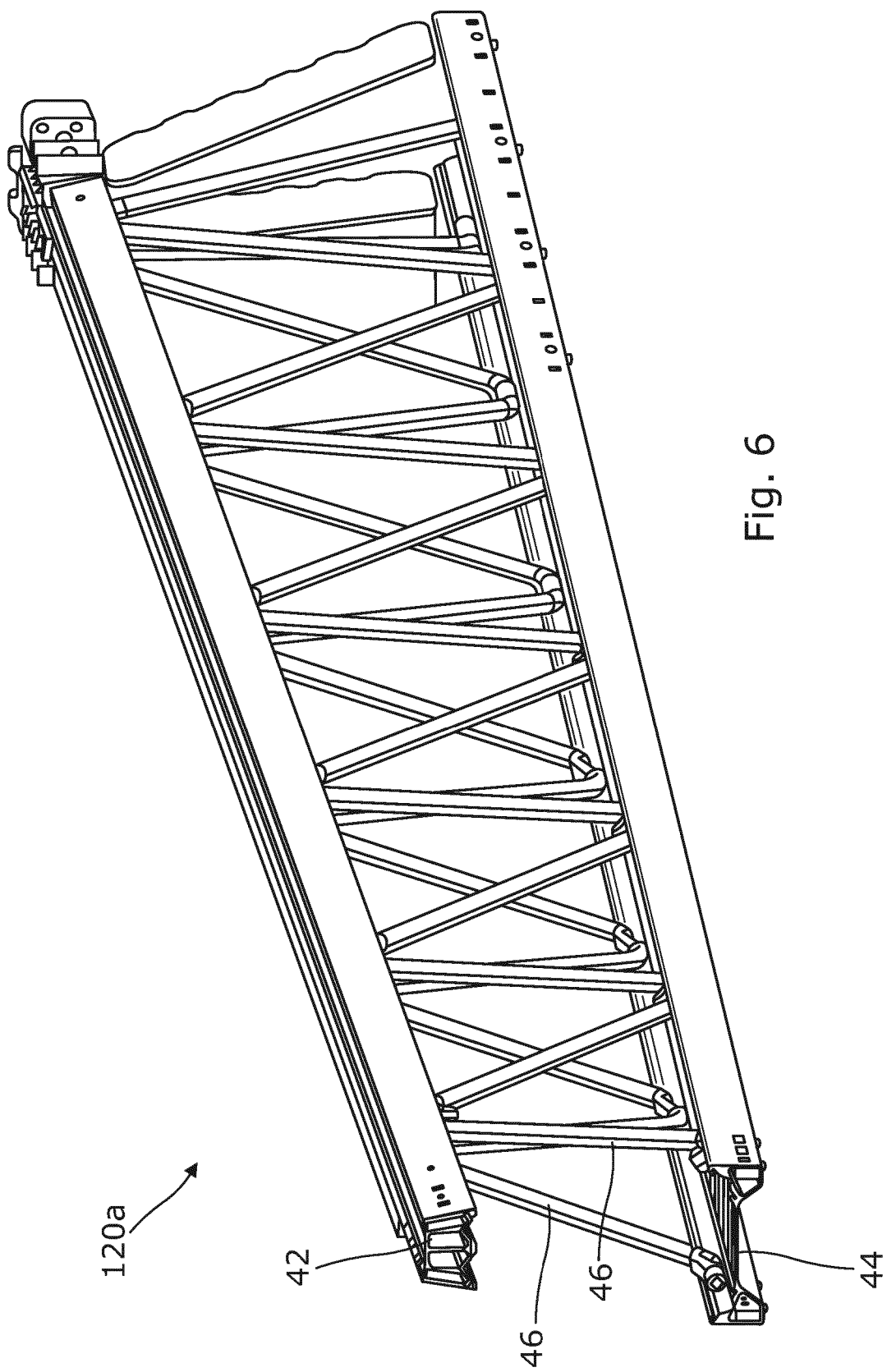
FIG. 6 is perspective view of a boom section constructed in accordance with a second embodiment of the invention.

FIG. 6 shows a boom section 120a comprising an upper beam 42 and a lower beam 44 both formed from extrusion or pultrusion. The upper beam 42 is fixed to the lower beam 44 by a pair of tubular members 46 which, as in the example above, are bent at locations along their length to define a plurality of brace members which extend diagonally in a substantially vertical plane. The tubular members 46 are clamped to the upper and lower beams 42,44 at various positions along the length of the boom section 120a.

Figure 7:
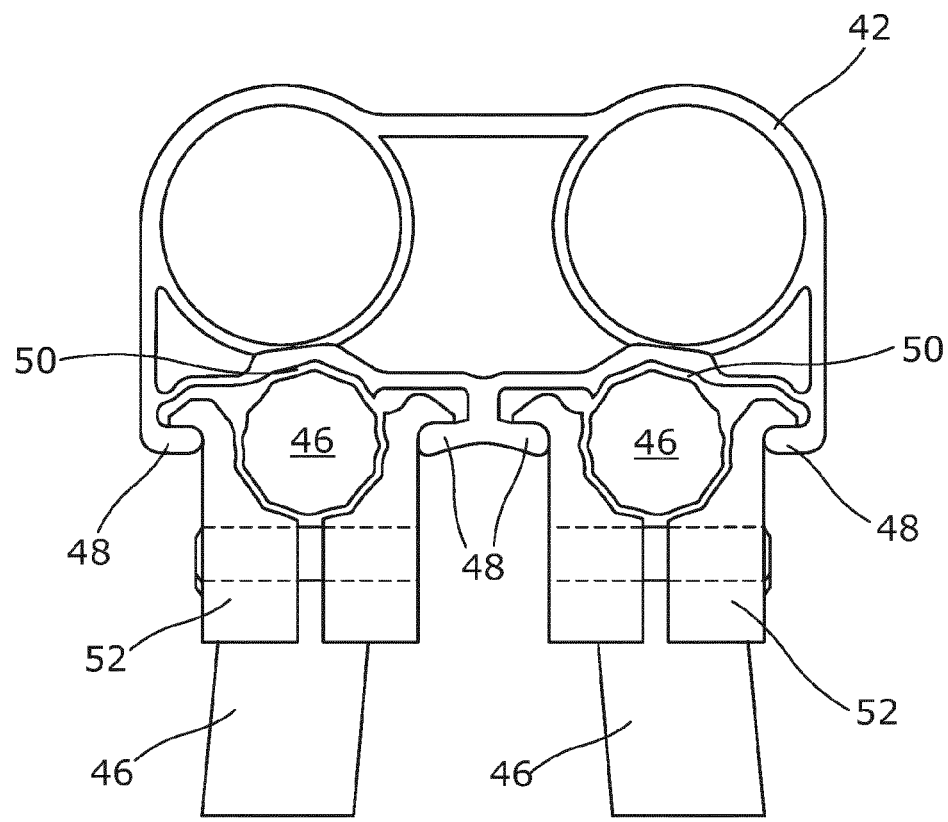
FIG. 7 is a vertical section showing the tubular members (which form the brace members) clamped to the upper beam.

With reference to FIG. 7, the upper beam 42 has an extruded profile that defines two pairs of opposing ledges 48 which extend continuously along the length of the boom section, wherein a first pair of ledges is disposed in front of the second pair of ledges, each pair of ledges being associated with a respective one of the two tubular members 46 as will become clear below.

The profile of the upper beam 42 also defines a continuous indent 50 configured to conform with the profile of the tubular members so as to receive such and, when held therein, to prevent fore and aft movement of the tubular members with respect to the upper beam.

Figure 9:
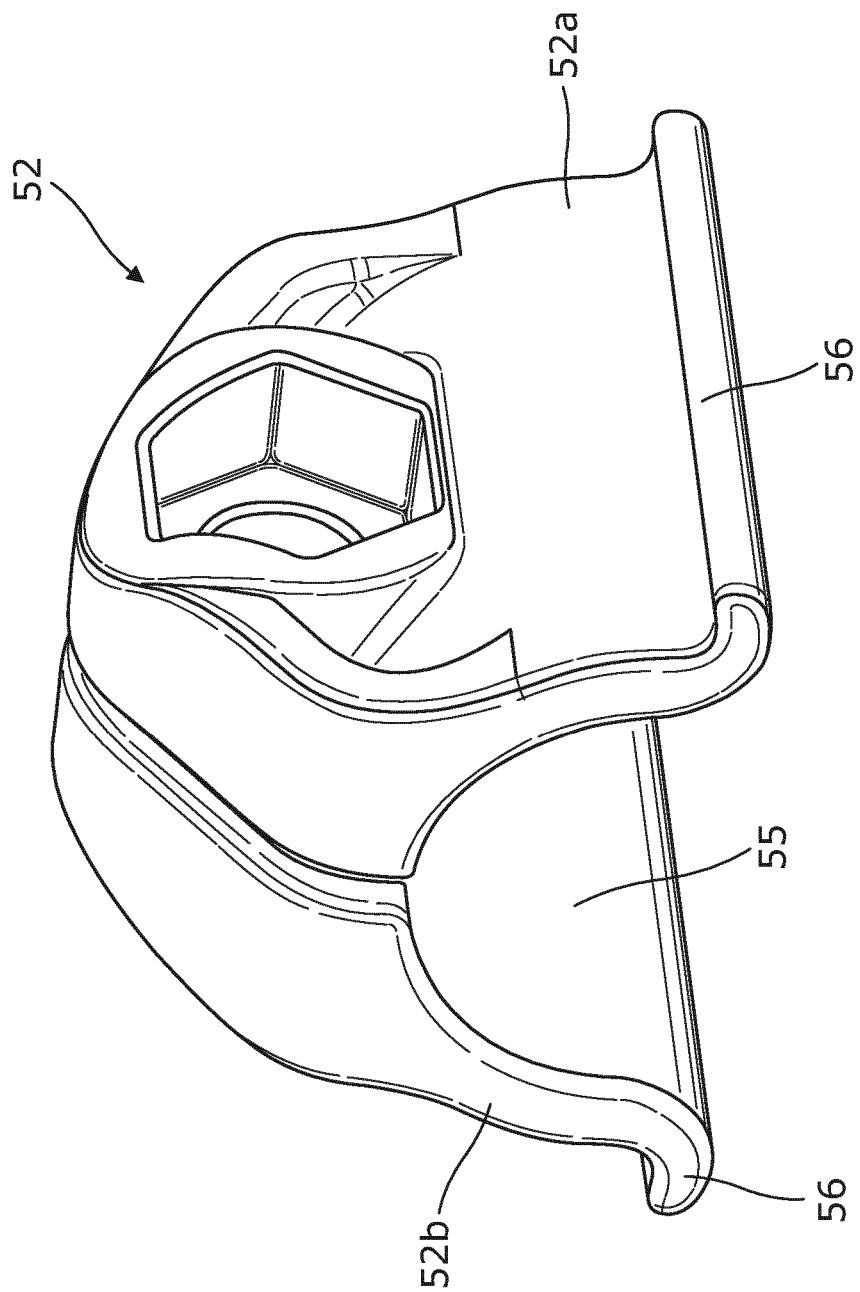

At each node of the truss arrangement, each tubular member 46 is held or gripped against the indent 50 by a clamp 52, a single one of which is shown in FIG. 9.

Each clamp 52 comprises two identical halves 52a, 52b which are held together by a threaded bolt 54. The profile of each clamp 52 defines a channel 55 having a profile that conforms with that of the tubular members 46 and, as such, is configured to receive the tubular members 46. Each clamp 52 comprises a pair of lips 56 that extend parallel to the channel 55.

In use, the lips 56 each engage a respective one of the ledges 48 whilst the tubular member resides in the channel 55 and indent 50. When the two clamp halves are secured together by tightening the bolt 52, the lips 56 are forced apart thus further engaging the ledges 48 and applying pressure against the tubular member.

Figure 8:
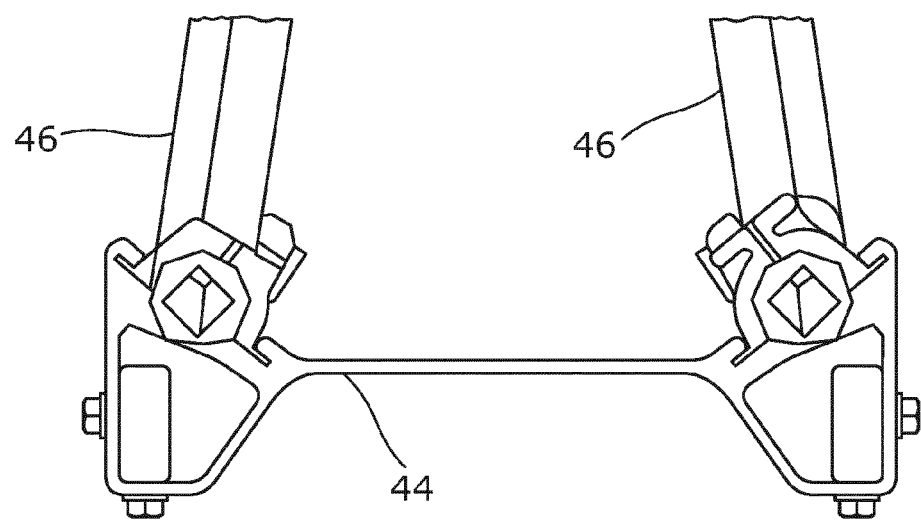
FIG. 8 is a vertical section showing the tubular members clamped to the lower beam; and, FIG. 9 is an enlarged perspective view of one clamp in accordance with the second embodiment.

The same method of securing the tubular members applies to the lower beam 44 as shown in FIG. 8.

Each half of the clamp 52a, 52b has a profile that defines a hexagonal recess 59 which is configured to receive a head of the bolt 52 to prevent rotation thereof and ease the assembly process.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure.

The invention claimed is:

1. An agricultural sprayer boom comprising vertically spaced upper and lower beams extending along the boom connected by a plurality of brace members formed from a unitary bent tubular member that is secured to the upper and lower beams, and gripped by, a plurality of clamps, wherein at least one of the upper and lower beams present a linear protuberance extending along the boom axis, and wherein each of said clamps comprises a pair of parallel clamping sleeves which grip the protuberance and the tubular member respectively.

2. The boom according to claim 1, wherein each clamp comprises two halves each having a profile that defines a portion of each of the clamping sleeves, wherein the halves of each clamp are secured together by bolts.

3. An agricultural sprayer boom comprising vertically spaced upper and lower beams extending along the boom connected by a plurality of brace members formed from a unitary bent tubular member that is secured to the upper and lower beams, and gripped by, a plurality of clamps, wherein the at least one of the upper and lower beams present a pair of opposing ledges, and wherein each clamp comprises a pair of lips and a channel, and wherein each lip engages a respective one of the ledges and the tubular member is received in the channel and held against the at least one of the upper and lower beams.

4. The boom according to claim 3, wherein each clamp comprises two halves which are held together by a respective bolt.

5. The boom according to claim 3, wherein the at least one of the upper and lower beams is formed from extrusion and comprises an extruded profile which defines the ledges.

6. The boom according to claim 3, wherein the tubular member is formed from aluminum.

7. The boom according to claim 1, wherein the tubular member is formed from aluminum.

\* \* \* \* \*